(12) United States Patent
Mihaylov et al.

(10) Patent No.: US 9,677,155 B2
(45) Date of Patent: Jun. 13, 2017

(54) METHOD FOR RECOVERING SCANDIUM FROM INTERMEDIATE PRODUCTS FORMED IN THE HYDROMETALLURGICAL PROCESSING OF LATERITE ORES

(71) Applicant: VALE S.A., Rio de Janeiro (BR)

(72) Inventors: Indje Mihaylov, Mississauga (CA); Ryan Peterson, Mississauga (CA); Avinash Singhal, Mississauga (CA); Christopher Massey, Mississauga (CA)

(73) Assignee: VALE S.A., Rio de Janeiro (BR)

( * ) Notice: Subject to any disclaimer, the term of this patent is extended or adjusted under 35 U.S.C. 154(b) by 391 days.

(21) Appl. No.: 14/257,647

(22) Filed: Apr. 21, 2014

(65) Prior Publication Data

US 2014/0314639 A1   Oct. 23, 2014

Related U.S. Application Data

(60) Provisional application No. 61/814,735, filed on Apr. 22, 2013.

(51) Int. Cl.
| | | |
|---|---|---|
| *C22B 59/00* | (2006.01) | |
| *C22B 1/00* | (2006.01) | |
| *C22B 3/44* | (2006.01) | |
| *C22B 3/00* | (2006.01) | |

(52) U.S. Cl.
CPC ............... *C22B 59/00* (2013.01); *C22B 1/00* (2013.01); *C22B 3/44* (2013.01); *C22B 23/0415* (2013.01); *Y02P 10/234* (2015.11)

(58) Field of Classification Search
None
See application file for complete search history.

(56) References Cited

U.S. PATENT DOCUMENTS

| | | | |
|---|---|---|---|
| 5,180,563 A | 1/1993 | Lai et al. | |
| 5,756,056 A * | 5/1998 | Kimura | ............... C22B 23/043 |
| | | | 423/140 |
| 7,993,612 B2 * | 8/2011 | Mackowski | ............... C22B 1/11 |
| | | | 423/150.1 |
| 2012/0207656 A1 * | 8/2012 | Duyvesteyn | ............... C22B 1/04 |
| | | | 423/21.1 |

FOREIGN PATENT DOCUMENTS

| | | |
|---|---|---|
| JP | 2000-313928 A | 11/2000 |
| RU | 2247788 C1 * | 3/2005 |

OTHER PUBLICATIONS

European Search Report dated Sep. 3, 2014 issued in European Patent Application No. EP14165405.
Weiwei Wang et al., "Metallurgical processes for scandium recovery from various resources: A review," Hydrometallurgy 108 (2011) 100-108.

* cited by examiner

*Primary Examiner* — Melissa Swain
(74) *Attorney, Agent, or Firm* — Arent Fox LLP

(57) ABSTRACT

The invention provides a method for recovering scandium from scandium-containing intermediate products, formed during hydrometallurgical processing of scandium-containing feed materials, including: (a) leaching of the scandium-containing intermediate products with a suitable acid at a controlled pH selected to maximize scandium extraction and minimize the co-extraction of impurities, (b) solid/liquid separation, to obtain a scandium-containing leach solution; (c) selective precipitation of the scandium at a controlled pH from the scandium-containing leach solution using a suitable base, (d) solid/liquid separation, to obtain an upgraded scandium concentrate and a barren solution for return to the hydrometallurgical process. A further upgraded scandium concentrate can be obtained by (e) alkaline leaching of the upgraded scandium concentrate for additional removal of impurities, and (f) solid/liquid separation to obtain a further upgraded scandium concentrate and impurities-containing base solution.

28 Claims, No Drawings

METHOD FOR RECOVERING SCANDIUM FROM INTERMEDIATE PRODUCTS FORMED IN THE HYDROMETALLURGICAL PROCESSING OF LATERITE ORES

CROSS REFERENCE TO RELATED APPLICATIONS

This application is based upon and claims the benefit of priority of the U.S. Patent Application No. 61/814,735, filed Apr. 22, 2013, the disclosure of the prior application is hereby incorporated in its entirety by reference.

BACKGROUND OF THE INVENTION

Scandium is an important ingredient for specialty aluminum alloys for aerospace and other applications. In recent years, scandia (scandium oxide) has been shown to be highly beneficial as a stabilizer for zirconia (zirconium oxide) based solid oxide fuel cells for extending the service life and efficiency of these cells in generating electricity. With society's increasing emphasis on greener sources of energy, the use of solid oxide fuel cells is expected to grow substantially.

A restraining factor for the wider commercial use of scandium has been its limited availability, the lack of reliable long-term supply, and the very high cost of recovery.

Laterite ores, commercially processed for the recovery of nickel and cobalt, contain small (tens to hundreds of grams per metric tonne) quantities of scandium. The acid (usually sulfuric) leach processes used for nickel/cobalt recovery from these ores also extract the scandium into the leach solution to a significant (usually >90%) degree, see Haslam and Arnall, An investigation into the feasibility of extracting scandium from nickel laterite ores, In: *ALTA* 1999 and Cheng et 2011, Metallurgical processes for scandium recovery from various resources: A review, *Hydrometallurgy*, 108: 100-108, both of which are incorporated by reference in their entirety.

These processes, therefore, have the potential to become a significant new source for scandium, easing the supply constraints, and enabling wider application of scandium in meeting society's needs.

However, there are several challenges with the recovery of scandium from laterite acid each solutions. The scandium concentration in the leach solution is typically very low, generally <20 mg/L, and there are many other metals, besides Ni and Co, and other impurities, that are present in much higher, gram-per-liter, concentrations, which can interfere with the scandium recovery. The very low scandium concentration also means that its recovery directly from these solutions in commercially significant quantities will require treatment of very large volumes of solution.

In the prior art, methods are described in which scandium is recovered from laterite ore as a precipitate from the acid each solution after nickel and cobalt recovery as a sulfide precipitate (U.S. Pat. No. 5,756,056; Haslam and Arnall, An investigation into the feasibility of extracting scandium from nickel laterite ores, In: *ALTA* 1999) or from the pregnant leach solution (PLS) using solvent extraction (Pery et al., Scandium breathes new life into gold Greenvale nickel mine, In: *ALTA* 2012). However, these methods have the disadvantage of having to treat the entire volume of the leach solution, containing scandium at generally <20 mg/L levels, either before or after the nickel/cobalt recovery, while still having a number of impurities, such as iron, aluminum, silica, and others, at levels that are orders of magnitude higher than the scandium level—particularly if the scandium recovery is to be carried out before the nickel/cobalt recovery. This can make the scandium recovery operationally difficult and expensive.

DETAILED DESCRIPTION OF THE INVENTION

The present invention overcomes these drawbacks of the prior art by providing a process to recover scandium from an intermediate product that is largely free of, or has low levels of nickel and cobalt, and which may already be produced as part of the recovery of nickel and cobalt from laterite ores. Such an intermediate product advantageously contains a substantial portion of the scandium leached during the acid leaching step, and is produced in relatively small quantities so as to enable a reduction in the size of the processing equipment required. Furthermore, an intermediate product that is largely free, or has low levels, of nickel and cobalt, can be treated for scandium recovery separately from the main nickel/cobalt processing circuits. This will have the advantage of minimizing the impact of the scandium processing circuits on the nickel/cobalt revenue generating facilities.

The present invention provides a method for recovering scandium from intermediate products formed in hydrometallurgical processing, the method comprising the following steps: (a) leaching of the scandium-containing intermediate products with a suitable acid at a controlled pH, (b) solid/liquid separation, to obtain a scandium-containing leach solution; (c) selective precipitation of the scandium at a controlled pH from the scandium-containing leach solution using a suitable base, (d) solid/liquid separation, to obtain an upgraded scandium concentrate and a barren solution for return to the hydrometallurgical process; and optionally (e) leaching of the upgraded scandium concentrate with a suitable base to further remove impurities, (f) solid/liquid separation to obtain a further upgraded scandium concentrate and impurities-containing base solution.

The suitable acid in step (a) is selected from the group of mineral acids, the group consisting preferably of hydrochloric acid and sulfuric acid, more preferably of sulfuric acid.

The suitable target pH in step (a) is generally set in the range of 2.0 to 4.0, preferably in the range of 2.5 to 3.5, more preferably in the range of 2.9 to 3.2.

The present invention discloses a scandium recovery process in which the feed material is a precipitate (an intermediate product), formed when the acidic PLS (pregnant leach solution), produced during the acid leaching processes for nickel/cobalt recovery, is partially neutralized (PN) and the major impurities, such as iron, aluminum and silica are precipitated. As mentioned before, this precipitate is commonly produced in these processes for nickel/cobalt recovery from laterites and in many of these processes, the scandium leached from the laterite ore is essentially completely precipitated and reports into that precipitate.

Depending on the particular flowsheet configuration, this precipitate is produced from one or two separate processing steps; when the precipitate is produced from two separate steps (PN1 and PN2), the compositions of the two precipitates are somewhat different. In the processes operated for nickel/cobalt recovery, the PN2 precipitate is recycled to the front of the PN1 processing step where it is dissolved to liberate the Ni/Co values precipitated in PN2 using the acidity of the PLS from the upstream laterite acid leaching step. During that dissolution, the scandium in the PN2 precipitate is also liberated.

While scandium recovery with the present invention is possible from either precipitate, the second precipitate (PN2) is generally preferred because it is generated at a lower mass rate, yet at a higher scandium grade, than the first precipitate (PN1).

In the present invention, the precipitate is typically collected as an underflow slurry from a thickener, and then advantageously filtered and washed to produce a washed filter cake. Producing such cake is beneficial for minimizing the transfer of the Ni/Co bearing solution to the scandium recovery process. However, neither the filtration nor the washing of the cake need be excessive.

The filter cake is then leached with acid (step a), such as sulfuric acid, to a suitably controlled target pH, which is generally set in the range between pH 2.0 and 4.0.

There is little incentive to target pH<2.0 as the scandium dissolution is already nearly complete, as illustrated in Table 1:

As these results illustrate, the difference in the dissolved levels of nickel, aluminum, iron and silica between pH 2.5 and pH 3.0 is very significant. Another advantage is the significantly lowered sulfuric acid consumption.

Following the step (b) of solid/liquid separation, which may be aided by the addition of a suitable flocculant, the

TABLE 1

Effect of pH on metal extractions

| Test | pH | Cumulative $H_2SO_4$ Addition g | Solids Composition (%) | | | | | | | Extraction (%) | | | | | |
|---|---|---|---|---|---|---|---|---|---|---|---|---|---|---|---|
| | | | Sc µg/g | Ni | Co | Al | Fe | Si | Cu | Sc | Ni | Co | Al | Fe | Cu |
| Feed | | — | 1100 | 1.19 | 0.033 | 9.05 | 1.76 | 0.37 | 0.09 | — | — | — | — | — | — |
| Leach at pH | 2.5 | 134 | 145 | 1.92 | 0.014 | 4.91 | 2.56 | 0.27 | 0.09 | 92.9 | 13.5 | 77.3 | 70.9 | 22.0 | 41.3 |
| Leach at pH | 2.0 | 172 | 95.8 | 1.77 | 0.014 | 4.01 | 2.24 | 0.24 | 0.07 | 95.6 | 25.0 | 78.6 | 77.7 | 35.8 | 56.7 |
| Leach at pH | 1.5 | 197 | 51.6 | 1.17 | 0.005 | 2.72 | 1.26 | 0.20 | 0.03 | 97.5 | 47.4 | 91.9 | 83.9 | 61.7 | 81.7 |
| Leach at pH | 1.0 | 224 | 18.1 | 0.78 | <0.002 | 1.78 | 1.13 | 0.22 | 0.01 | 99.3 | 74.0 | 97.6 | 92.2 | 74.6 | 96.3 |
| Leach at pH | 0.5 | 257 | 3.78 | 0.108 | <0.002 | 0.32 | 0.96 | 0.20 | 0.002 | 99.9 | 96.9 | 97.9 | 98.8 | 81.1 | 99.2 |

Advantageously, the target pH is set in the range between pH 2.5 and 3.5, and more advantageously, the target pH is set in the range between pH 2.9 and 3.2.

Operating within this target pH ensures a high degree of scandium dissolution while limiting the dissolution of other metals, such as iron, aluminum, silica and nickel, present in the intermediate precipitate.

Operating within this target pH range results in somewhat suppressed scandium dissolution, however, the dissolution of iron, aluminum, silica and nickel present in the precipitate is very significantly suppressed.

The deliberate suppression of the iron, aluminum and silica dissolution is advantageous as it enables much faster and more efficient solid/liquid separation of the scandium-containing dissolution solution from the remaining solids of the precipitate. The solids are recycled back into the main nickel/cobalt processing circuits, such as the front of the PN1 processing step, such that the undissolved scandium, along with other valuable metals, such as nickel and cobalt, present in the solids, are recovered.

The deliberate suppression of the dissolution of iron, aluminum and silica as well as of nickel, cobalt and other impurities is further advantageous as it enables the production of a purer dissolution solution containing impurities in reduced amounts.

This is illustrated by the results in the following Table 2, which show the results of an experiment in which sulfuric acid was added in progressive amounts to a precipitate with a composition shown in the first row (as 'Feed').

scandium-containing dissolution solution is treated with a suitable base at a target pH range to selectively precipitate the scandium (step c) and obtain, after solid/liquid separation (step d), an upgraded scandium concentrate. The suitable base in step (c) is selected from the group consisting of sodium carbonate (soda ash), sodium hydroxide, magnesium oxide, and magnesium hydroxide.

More advantageously, the suitable base is selected from the group consisting of sodium carbonate (soda ash) and magnesium oxide. The precipitation is carried out at a pH within the range of 4.5 to 6.0. More advantageously, the precipitation is carried out at a pH within the range of 5.0 to 5.5.

The formation of this precipitate is illustrated by the following example.

Example

A sulfate leach solution containing (mg/L): 16 Sc, 1070 Ni, 65 Co, 585 Al, <4 Fe, 492 Ca, 62 Si, 169 Mn, 57 Zn, and 51 Cu, was treated with 150 g/L $Na_2CO_3$ solution at pH 5.5. After a solid/liquid separation, the barren solution contained no detectable scandium and contained (mg/L): 1010 Ni, 62 Co, 7 Al, <4 Fe, 468 Ca, 24 Si, 169 Mn, 47 Zn, and 9 Cu. The precipitated solids contained (wt %): 0.6 Sc, 0.7 Ni, 22.7 Al, 0.2 Fe, 0.09 Ca, 1.90 Si, 0.02 Mn, 0.2 Zn, and 1.4 Cu.

The precipitate (an upgraded scandium concentrate) can then be further advantageously upgraded by selectively

TABLE 2

Effect of pH on metals leaching

| Stream/Test | Sc | Ni | Co | Al | Fe | Ca | Cr | Mg | Si | S | Mn | Zn | Cu |
|---|---|---|---|---|---|---|---|---|---|---|---|---|---|
| Remaining Solids Composition (%) | | | | | | | | | | | | | |
| Feed | 0.06 | 4.3 | 0.2 | 7.4 | 4.8 | 14.5 | 0.4 | 0.1 | 1.6 | 14.4 | 1.0 | 0.1 | 0.2 |
| Leach (pH 4.0) | 0.06 | 4.2 | 0.2 | 7.1 | 4.7 | 14.2 | 0.4 | 0.0 | 1.5 | 13.9 | 1.0 | 0.1 | 0.2 |
| Leach (pH 3.5) | 0.06 | 4.0 | 0.2 | 6.9 | 4.5 | 13.5 | 0.4 | 0.0 | 1.4 | 13.3 | 0.9 | 0.1 | 0.2 |
| Leach (pH 3.0) | 0.04 | 3.5 | 0.1 | 6.7 | 4.9 | 14.5 | 0.4 | 0.0 | 1.4 | 14.6 | 0.9 | 0.0 | 0.1 |
| Leach (pH 2.5) | 0.01 | 2.5 | 0.1 | 4.3 | 5.5 | 18.0 | 0.4 | 0.0 | 1.0 | 16.9 | 0.8 | 0.0 | 0.1 |
| Dissolution Solution Composition (mg/L) | | | | | | | | | | | | | |
| Feed | <10.0 | 517 | 49 | 83 | 40 | 535 | 17 | 153 | 9 | 1280 | 174 | 27 | 5 |
| Leach (pH 4.0) | <10.0 | 545 | 53 | 7 | <4.0 | 497 | 19 | 146 | 23 | 1070 | 180 | 55 | 11 |
| Leach (pH 3.5) | 11.9 | 910 | 78 | 180 | <4.0 | 526 | 39 | 161 | 65 | 1710 | 259 | 100 | 39 |
| Leach (pH 3.0) | 69.1 | 2800 | 175 | 1980 | 16 | 518 | 110 | 174 | 315 | 6150 | 502 | 177 | 155 |
| Leach (pH 2.5) | 152 | 6790 | 355 | 9740 | 607 | 626 | 327 | 221 | 1750 | 23100 | 992 | 265 | 378 | leaching impurities such as aluminum, silicon and sulfur by a suitable base (step e). Aqueous solution of alkali metal hydroxides, such as sodium hydroxide and potassium hydroxide, are examples of a suitable base. Preferably, the suitable base is sodium hydroxide. The base solution can be used over a range of concentrations, preferably between 1 N and 8 N concentrations. More preferably, the base solution is used in concentrations between 2.5 N and 6 N concentrations. The following example illustrates this step.

An upgraded scandium concentrate, produced through steps as outlined above, and containing (wt %) 0.36 Sc, 5.4 Ni, 15.3 Al, 3.4 Fe, 0.1 Ca, 3.5 Si, 6.4 S, 0.17 Zn, and 0.7 Cu, was contacted with 2.5 N NaOH solution at 50° C. for 30 minutes. After this treatment and the solid/liquid separation, the product alkaline leach solution was found to contain 11.9 g/L Al and 0.49 g/L Si. The solution did not contain any scandium or nickel or iron. The product alkaline leach solids were found to contain (wt %): 0.8 Sc, 13.6 Ni, 8.9 Al, 7.7 Fe, 6.9 Si, 0.08 S, 0.31 Zn, and 1.7 Cu.

The upgraded and purified scandium-containing product precipitate produced by the process described in this invention can be subsequently refined to pure scandia via a variety of refining processes that may include solvent extraction, ion-exchange and the like.

What is claimed is:

1. A method for recovering scandium from a precipitate formed in a hydrometallurgical process, comprising:
    (a) obtaining a scandium-containing precipitate formed in a hydrometallurgical process for recovering nickel and cobalt from laterite ores;
    (b) leaching the scandium-containing precipitate formed in said hydrometallurgical process with an acid at a controlled pH;
    (c) performing a solid-liquid separation to obtain a scandium-containing leach solution;
    (d) selective precipitation of scandium at a controlled pH from the scandium-containing leach solution using a base; and
    (e) performing a solid-liquid separation to obtain an purified scandium concentrate and a barren solution for return to the hydrometallurgical process.

2. The method according to claim 1, wherein the scandium-containing precipitate is collected from a thickener underflow slurry that has been filtered and washed.

3. The method according to claim 1, wherein the acid in step (b) comprises a mineral acid.

4. The method according to claim 3, wherein the acid is selected from the group consisting of hydrochloric acid and sulfuric acid.

5. The method according to claim 4, wherein the acid is sulfuric acid.

6. The method according to claim 1, wherein the controlled pH in step (b) ensures scandium dissolution while limiting dissolution of other metals in the intermediate products.

7. The method according to claim 6, wherein the controlled pH is about 2.0 to about 4.0.

8. The method according to claim 7, wherein the controlled pH is about 2.5 to about 3.5.

9. The method according to claim 8, wherein the controlled pH is about 2.9 to about 3.2.

10. The method according to claim 1, wherein the base in step (d) is selected from the group consisting of sodium carbonate (soda ash), sodium hydroxide, magnesium oxide, and magnesium hydroxide.

11. The method according to claim 1, wherein the selective precipitation of step (d) is carried out at a controlled pH about 4.5 to about 6.0.

12. The method according to claim 11, wherein the controlled pH is about 5.0 to about 5.5.

13. A method for recovering scandium from a precipitate formed in a hydrometallurgical process, comprising:
    (a) obtaining a scandium-containing precipitate formed in a hydrometallurgical process for recovering nickel and cobalt from laterite ores;
    (b) leaching the scandium-containing precipitate formed in said hydrometallurgical process with an acid at a controlled pH;
    (c) performing a solid-liquid separation to obtain a scandium-containing leach solution;
    (d) selective precipitation of scandium at a controlled pH from the scandium-containing leach solution using a base;
    (e) performing a solid-liquid separation to obtain a first purified scandium concentrate and a barren solution for return to the hydrometallurgical process;
    (f) leaching of the first purified scandium concentrate with a base to remove impurities; and
    (g) performing a solid-liquid separation to obtain a second purified scandium concentrate and an impurities-containing base solution.

14. The method according to claim 13, wherein the scandium-containing precipitate is collected from a thickener underflow slurry that has been filtered and washed.

15. The method according to claim 13, wherein the acid in step (b) comprises a mineral acid.

16. The method of claim 15, wherein the acid is selected from the group consisting of hydrochloric acid and sulfuric acid.

17. The method of claim 16, wherein the acid is sulfuric acid.

18. The method according to claim 13, wherein the controlled pH in step (b) ensures scandium dissolution while limiting dissolution of other metals in the intermediate products.

19. The method of claim 18, wherein the controlled pH is about 2.0 to about 4.0.

20. The method of claim 19, wherein the controlled pH is about 2.5 to about 3.5.

21. The method of claim 20, wherein the controlled pH is about 2.9 to about 3.2.

22. The method according to claim 13, wherein the base in step (d) is selected from the group consisting of sodium carbonate (soda ash), sodium hydroxide, magnesium oxide, and magnesium hydroxide.

23. The method according to claim 13, wherein the selective precipitation of step (d) is carried out at a controlled pH of about 4.5 to about 6.0.

24. The method of claim 23, wherein the controlled pH is about 5.0 to about 5.5.

25. The method according to claim 13, wherein the suitable base in step (f) comprises an aqueous solution of alkali metal hydroxide.

26. The method of claim 25, wherein a concentration of the alkali metal hydroxide in the aqueous solution is from about 1 N and to about 8 N.

27. The method of claim 26, wherein the concentration of the alkali metal hydroxide in the aqueous solution is from about 2.5 N to about 6 N.

28. The method of claim 25, wherein the alkali metal hydroxide is sodium hydroxide.

* * * * *